US011468682B2

(12) United States Patent
Que et al.

(10) Patent No.: US 11,468,682 B2
(45) Date of Patent: Oct. 11, 2022

(54) TARGET OBJECT IDENTIFICATION

(71) Applicant: SENSETIME INTERNATIONAL PTE. LTD., Singapore (SG)

(72) Inventors: Bujun Que, Singapore (SG); Shuai Zhang, Singapore (SG); Yong Tao, Singapore (SG)

(73) Assignee: SENSETIME INTERNATIONAL PTE. LTD., Singapore (SG)

(*) Notice: Subject to any disclaimer, the term of this patent is extended or adjusted under 35 U.S.C. 154(b) by 0 days.

(21) Appl. No.: 16/768,484

(22) PCT Filed: Mar. 12, 2020

(86) PCT No.: PCT/IB2020/052192
§ 371 (c)(1),
(2) Date: May 29, 2020

(87) PCT Pub. No.: WO2021/130546
PCT Pub. Date: Jul. 1, 2021

(65) Prior Publication Data
US 2021/0312187 A1 Oct. 7, 2021

(30) Foreign Application Priority Data
Dec. 23, 2019 (SG) .......................... 10201913024Q

(51) Int. Cl.
*G06K 9/00* (2022.01)
*G06V 20/52* (2022.01)
(Continued)

(52) U.S. Cl.
CPC ........... *G06V 20/52* (2022.01); *G06K 9/6215* (2013.01); *G06T 7/292* (2017.01); *G06T 7/70* (2017.01);
(Continued)

(58) Field of Classification Search
CPC ........... G06K 9/00201; G06K 9/00221; G06K 9/00268; G06K 9/00288; G06K 9/00362;
(Continued)

(56) References Cited

U.S. PATENT DOCUMENTS 6,222,675 B1 4/2001 Mall et al.
9,189,918 B1 11/2015 Gronkowski et al.
(Continued)

FOREIGN PATENT DOCUMENTS

CN 105531715 A 4/2016
CN 108346124 A 7/2018
(Continued)

OTHER PUBLICATIONS

Search Report and Written Opinion for Singapore Application No. 10201913024Q, dated Feb. 3, 2020, 8 pages.
(Continued)

*Primary Examiner* — Eric Rush

(57) ABSTRACT

A target object identification system includes a first camera, a second camera, and a processor. The first camera acquires an image of a first target region. The second camera synchronously acquires an image of a second target region. The second target region includes part or all of the first target region. Resolution of the first camera is higher than that of the second camera, and field of view of the second camera is greater than that of the first camera. The processor identifies first target objects according to the image of the first target region, and second target objects according to the image of the second target region, and determines association relationships between the first target objects in the image of the first target region and the second target object in the synchronously acquired image of the second target region.

20 Claims, 4 Drawing Sheets

(51) Int. Cl.
| | |
|---|---|
| *G06K 9/62* | (2022.01) |
| *G07F 17/32* | (2006.01) |
| *G06V 10/48* | (2022.01) |
| *G06V 40/10* | (2022.01) |
| *G06V 40/16* | (2022.01) |
| *G06T 7/292* | (2017.01) |
| *G06V 10/764* | (2022.01) |
| *G06T 7/00* | (2017.01) |
| *G08B 13/196* | (2006.01) |
| *G06T 7/70* | (2017.01) |

(52) U.S. Cl.
CPC .............. *G06T 7/97* (2017.01); *G06V 10/48* (2022.01); *G06V 10/764* (2022.01); *G06V 40/10* (2022.01); *G06V 40/161* (2022.01); *G06V 40/172* (2022.01); *G07F 17/322* (2013.01); *G07F 17/3206* (2013.01); *G07F 17/3241* (2013.01); *G07F 17/3288* (2013.01); *G08B 13/19641* (2013.01); *G08B 13/19643* (2013.01); *G06V 2201/07* (2022.01)

(58) Field of Classification Search
CPC ........... G06K 9/00369; G06K 9/00375; G06K 9/00771; G06K 9/20; G06K 9/209; G06K 9/4633; G06K 9/6201; G06K 9/6215; G06K 9/6288; G06K 2009/2045; G06K 2209/21; G06T 7/292; G06T 7/30; G06T 7/70; G06T 7/97; G07F 17/3206; G07F 17/322; G07F 17/3237; G07F 17/3239; G07F 17/3241; G07F 17/3288; G07F 17/3293; G07F 17/329; A63F 3/00157; A63F 2003/00164; H04N 7/08; H04N 7/0806; H04N 7/181; H04N 7/188; G08B 13/19262; G08B 13/19628; G08B 13/19641; G08B 13/19643; G06V 10/12; G06V 10/16; G06V 10/48; G06V 10/70; G06V 10/764; G06V 20/00; G06V 20/52; G06V 20/60; G06V 20/64; G06V 40/10; G06V 40/103; G06V 40/107; G06V 40/16; G06V 40/161; G06V 40/172; G06V 40/173; G06V 40/20; G06V 40/28; G06V 2201/07
USPC ....... 382/100, 103, 115, 118, 135, 136, 181, 382/224, 291, 294, 325; 273/274, 309; 463/7–14, 17, 25, 29; 348/135, 139, 143, 348/144, 159, 169
See application file for complete search history.

(56) References Cited

U.S. PATENT DOCUMENTS

| | | | |
|---|---|---|---|
| 10,380,837 B2 † | 8/2019 | Dallmeier | |
| 11,284,041 B1 * | 3/2022 | Bergamo | G06V 40/103 |
| 2002/0042298 A1 * | 4/2002 | Soltys | G07F 17/322 |
| | | | 463/29 |
| 2005/0026680 A1 * | 2/2005 | Gururajan | G07F 17/3241 |
| | | | 463/25 |
| 2005/0272501 A1 * | 12/2005 | Tran | G07F 17/3241 |
| | | | 463/29 |
| 2006/0177109 A1 | 8/2006 | Storch | |
| 2009/0219391 A1 * | 9/2009 | McLeish | G06T 7/277 |
| | | | 348/169 |
| 2015/0019391 A1 † | 1/2015 | Kumar | |
| 2017/0330414 A1 * | 11/2017 | Dallmeier | G07F 17/3241 |
| 2018/0211472 A1 | 7/2018 | Shigeta | |
| 2018/0218224 A1 | 8/2018 | Olmstead et al. | |
| 2019/0371112 A1 † | 12/2019 | Shigeta | |
| 2020/0034629 A1 * | 1/2020 | Vo | G06K 9/00771 |
| 2020/0202134 A1 * | 6/2020 | Bulzacki | G06K 9/00771 |
| 2021/0056804 A1 * | 2/2021 | Eager | G07F 17/3241 |
| 2022/0004748 A1 * | 1/2022 | Li | G06V 40/16 |

FOREIGN PATENT DOCUMENTS

| | | |
|---|---|---|
| CN | 110719800 A | 1/2020 |
| JP | 2003134375 A | 5/2003 |
| JP | 2007036756 A | 2/2007 |
| JP | 2010244089 A | 10/2010 |
| JP | 2012018593 A | 1/2012 |
| JP | 2016111578 A | 6/2016 |
| JP | 2017505661 A | 2/2017 |
| JP | 2017117030 A | 6/2017 |
| JP | 2018032403 A | 3/2018 |
| JP | 2018042270 A | 3/2018 |
| JP | 2018069037 A | 5/2018 |
| JP | 2018079311 A | 5/2018 |
| JP | 2019096119 A | 6/2019 |
| JP | 2019098155 A | 6/2019 |
| JP | 2019111353 A | 7/2019 |
| JP | 2019188175 A | 10/2019 |
| WO | 2017022767 A1 | 2/2017 |
| WO | 2018025622 A1 | 2/2018 |
| WO | 2018025885 A1 | 2/2018 |
| WO | 2018139303 A1 | 8/2018 |
| WO | 2019111593 A1 | 6/2019 |

OTHER PUBLICATIONS

International Search Report and Written Opinion Issued in Application No. PCT/IB2020/052192, dated Aug. 19, 2020, 7 pages.
Macao Intellectual Property Office, Disagreement Issued in Application No. I/1669, dated Dec. 16, 2021, 29 pages.
Japanese Patent Office, Office Action Issued in Application No. 2021-518958, dated Jun. 7, 2022, 14 pages.
Intellectual Property Office of the Philippines Bureau of Patents, Office Action Issued in Application No. 1/2020/550746, dated May 26, 2022, 4 pages.

* cited by examiner
† cited by third party

TARGET OBJECT IDENTIFICATION

CROSS REFERENCE TO RELATED APPLICATIONS

This application is the America national phase application of International Application No. PCT/IB2020/052192 filed on Mar. 12, 2020, which claims priority to Singaporean Patent Application No. 10201913024Q entitled "TARGET OBJECT IDENTIFICATION SYSTEM, METHOD AND APPARATUS, ELECTRONIC DEVICE AND STORAGE MEDIUM" and filed on Dec. 23, 2019, the disclosure of which is incorporated herein by reference in its entirety.

TECHNICAL FIELD

The present disclosure relates to computer vision technology and, in particular, to a target object identification system, method and apparatus, an electronic device and a storage medium.

BACKGROUND

In recent years, with the continuous development of artificial intelligence technology, artificial intelligence technology has achieved relatively good results in computer vision, speech recognition and other aspects. In some relatively special scenes (such as tabletop game scenes), due to the limitation of the field of view and the resolution in photographing by a camera, it is impossible to accurately identify and monitor the player's betting situation and the player's winning or losing situation.

SUMMARY

According to an aspect of the present disclosure, provided is a target object identification system, including a first image acquisition apparatus, a second image acquisition apparatus, and a processor, where: the first image acquisition apparatus is configured to acquire an image of a first target region, the second image acquisition apparatus is configured to synchronously acquire an image of a second target region, and the second target region includes part or all of the first target region; the resolution of the first image acquisition apparatus is higher than that of the second image acquisition apparatus, and the field of view of the second image acquisition apparatus is greater than that of the first image acquisition apparatus; and the processor is configured to: identify each first target object according to the image of the first target region, and identify each second target object according to the image of the second target region; and determine association relationship between each first target object in the image of the first target region and each second target object in the synchronously acquired image of the second target region, where the first target object is a target object in the first target region, and the second target object is a target object in the second target region.

According to an aspect of the present disclosure, provided is a target object identification method, including: identifying each first target object according to an image of a first target region, and identifying each second target object according to an image of a second target region which is acquired synchronously with the image of the first target region; and determining association relationship between each first target object in the image of the first target region and each second target object in the image of the second target region, wherein the first target object is a target object in the first target region, the second target object is a target object in the second target region, and the second target region comprises part or all of the first target region; the image of the first target region is acquired by means of a first image acquisition apparatus, and the image of the second target region is acquired by means of a second image acquisition apparatus; and a resolution of the first image acquisition apparatus is higher than that of the second image acquisition apparatus, and a field of view of the second image acquisition apparatus is greater than that of the first image acquisition apparatus.

According to an aspect of the present disclosure, provided is an electronic device, including: a memory and a processor, where the memory may store instructions executable by the processor, and the processor may execute the instructions to implement the target object identification method according to any embodiment of the present disclosure.

According to an aspect of the present disclosure, provided is a computer-readable storage medium having computer program instructions stored thereon, where the computer program instructions, when executed by a processor, may cause the processor to implement the target object identification method according to any embodiment of the present disclosure.

In embodiments of the present disclosure, images corresponding to a large field of view (global scope) are acquired by means of the second image acquisition apparatus, and images corresponding to a small field of view (key region) are acquired by means of the first image acquisition apparatus. Because the resolution of the first image acquisition apparatus is higher than that of the second image acquisition apparatus, the images acquired by the first image acquisition apparatus may better distinguish the original details. That is, the second image acquisition apparatus aim to acquire images in a larger field of view, and the first image acquisition apparatus aim to distinguish the target objects in the key region. Thus, the target object identification system of the present disclosure may have both the large field of view and the high resolution of the image of the key region, thereby improving the identification precision for the target object and environmental robustness.

DETAILED DESCRIPTION OF THE EMBODIMENTS

Figure 1:
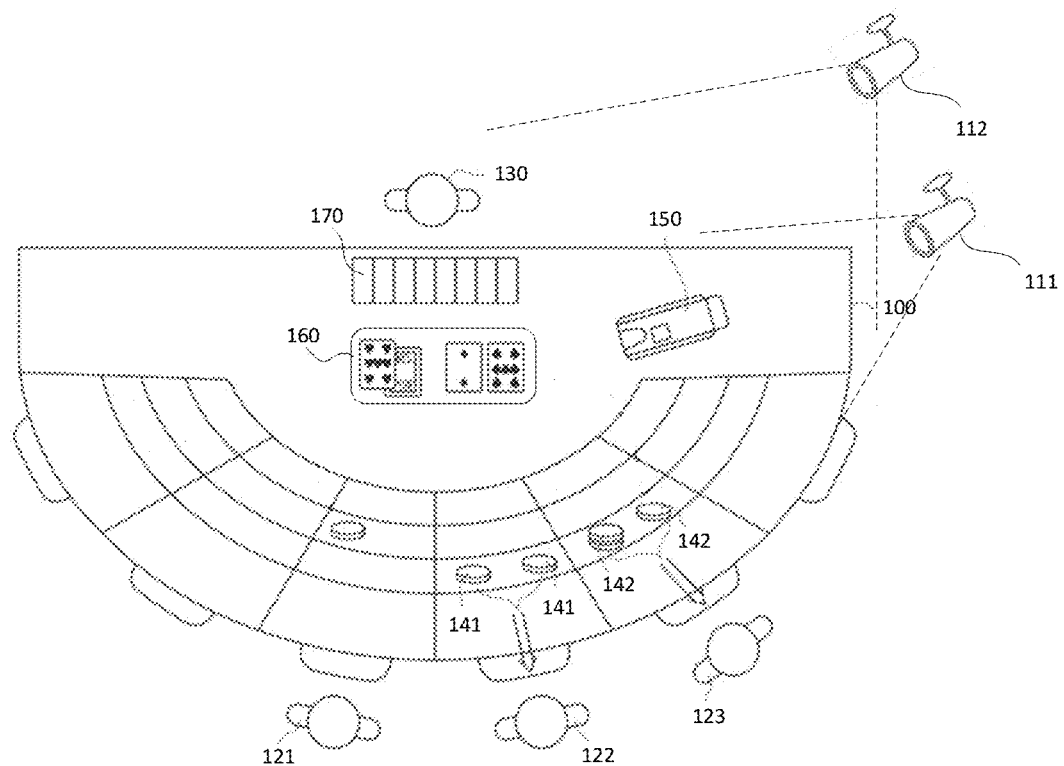
FIG. 1 is a schematic diagram of a target object identification system according to at least one embodiment of the present disclosure.

To make persons skilled in the art better understand the present disclosure, some embodiments thereof will be clearly and completely described below with reference to the accompanying drawings. It is apparent that the described embodiments are only part of possible embodiments of the present disclosure. All other embodiments, which may be obtained by a person of ordinary skill in the art based on one or more embodiments of the present disclosure without any inventive effort, fall within the scope of the present disclosure.

At least one embodiment of the present disclosure provides a target object identification system. The target object identification system includes a first image acquisition apparatus, a second image acquisition apparatus, and a processor.

The first image acquisition apparatus is configured to acquire an image of a first target region, the second image acquisition apparatus is configured to synchronously acquire an image of a second target region, and the second target region includes part or all of the first target region. Each of the image of the first target region and the image of the second target region may be a frame in a video stream, or may be an image obtained in real time.

The resolution of the first image acquisition apparatus is higher than that of the second image acquisition apparatus, and the field of view of the second image acquisition apparatus is greater than that of the first image acquisition apparatus.

The processor implements identification of a target object by means of the following steps.

First, each first target object is identified based on the image of the first target region, and each second target object is identified based on the image of the second target region. The first target object is a target object in the first target region, and the second target object is a target object in the second target region.

In order to improve the accuracy and precision of monitoring the first target object, and because the field of view of the first target region is concentrated, a first image acquisition apparatus with a long focal length, a small pixel-size and a high resolution may be adopted to acquire the image of the first target region, so that an image of the first target region with high resolution, high color reproduction, and a large range of depth of field may be obtained.

Because the field of view of the second target region requires a high range, and the illumination of the game field is generally low, the apparatus that acquires the image of the second target region has high requirements for low-illumination capacity and wide dynamic adaptability. Therefore, a second image acquisition apparatus with a short focal length, a large pixel-size and a moderate resolution may be adopted to acquire the image of the second target region.

Next, association relationship between each first target object in the image of the first target region and each second target object in the synchronously acquired image of the second target region is determined.

In the embodiments of the present disclosure, images of a first target region are acquired by means of a first image acquisition apparatus, and images of a second target region are acquired by means of a second image acquisition apparatus. The second target region includes part or all of the first target region, and the field of view of the second image acquisition apparatus is greater than the field of view of the first image acquisition apparatus. That is, images corresponding to a large field of view (global scope) are acquired by means of the second image acquisition apparatus, and images corresponding to a small field of view (key region) are acquired by means of the first image acquisition apparatus. Because the resolution of the first image acquisition apparatus is higher than that of the second image acquisition apparatus, the images acquired by the first image acquisition apparatus may better distinguish the original details. That is, the second image acquisition apparatus aim to acquire images in a larger field of view, and the first image acquisition apparatus aim to distinguish the target objects in the key region (such as distinguishing the value and quantity of game chips, cash, etc.). Then, each first target object in the image of the first target region is associated with a second target object in the synchronously acquired image of the second target region. Thus, the target object identification system may have both the large field of view and the high resolution of the image of the key region, thereby improving the identification precision for the target object and environmental robustness.

FIG. 1 is a schematic diagram of a target object identification system according to at least one embodiment of the present disclosure. The system includes a first image acquisition apparatus 111, a second image acquisition apparatus 112, and a processor (not shown). The first image acquisition apparatus 111 is used to acquire an image of a first target region. The image of the first target region may be an image of a game table 100 and related objects thereon. Each first target object identified based on the image of the first target region may be a target object related to the game object, for example, one of exchanged objects (such as game chips 141~142), exchanges (such as cash 150), cards 160~170 or the like. The second image acquisition apparatus 112 is configured to synchronously acquire an image of the second target region. The image of the second target region may be, for example, an image of the game table 100 and people (such as players 121~123 and a dealer 130) around the game table, and each second target object identified based on the image of the second target region may be a player or a dealer.

The first image acquisition apparatus 111 and the second image acquisition apparatus 112 may be disposed adjacent to each other, and may perform image acquisition on the scene at any angle of view as required. For example, both of the two apparatuses may perform image acquisition from a top view, or perform image acquisition from a side view.

In a game scene, generally, the illumination of the game table region is high while the illumination of the surroundings of the game table is low. Therefore, an image acquisition apparatus is used to synchronously acquire an image of people at the game table and around the game table. With this image, it is not possible to identify the details of a game-related target at the game table while covering the players or dealer around the game table and accurately identifying the betting position, betting action, and betting player.

In some embodiments, a camera with a long focal length may be used to acquire images of the first target region, and a camera with a short focal length may be used to synchronously acquire images of the second target region. The image of the first target region obtained by photographing the game table region by means of the camera with a long focal length has high resolution and color reproduction. Therefore, the details of the game-related target on the game table, such as details of exchanged objects, exchanges, and cards, may be detected from the image of the first target region. The camera with a short focal length is used to photograph people at the game table and around the game table, the field of view is wide, and the low-illumination capacity is high. Therefore, with the image of the second target region acquired by means of the camera with a short focal length, people around the game table and actions thereof may be better identified. The combination of the cameras respectively with long and short focal lengths may solve the problem of insufficient image density in the central hot zone and insufficient brightness in the surrounding hot zone occurring when a single camera is used to acquire an image covering the game table region and people.

In some embodiments, a camera with a small pixel-size may be used to acquire the image of the first target region, and a camera with a large pixel-size may be used to synchronously acquire the image of the second target region. The image of the first target region obtained by photographing the game table region by means of the camera with a small pixel-size has high resolution and a large range of depth of field. Therefore, the details of the game-related target on the game table, such as details of the exchanged objects, exchanges, and cards, may be detected from the image of the first target region. The camera with a large pixel-size is used to photograph people at the game table and around the game table. The field of view is wide, and the low-illumination capacity is high. Therefore, with the image of the second target region acquired by means of the camera with a large pixel-size, people around the game table and actions thereof may be better identified. The combination of the camera with a small pixel-size and the camera with a large pixel-size may solve the problem of insufficient depth of field in the central hot zone and insufficient illumination in the surrounding hot zone occurring when a single camera is used to acquire an image covering the game table region and people.

In some embodiments, a high-resolution camera may be used to acquire the image of the first target region, and a low-resolution camera may be used to synchronously acquire the image of the second target region. The high-resolution camera is a center camera, and the low-resolution camera is the wide-angle camera. The image of the first target region obtained by photographing the game table region by means of the high-resolution center camera has high resolution. Therefore, the details of the game-related target on the game table, such as details of exchanged objects, exchanges, and cards, may be detected from the image of the first target region. The low-resolution wide-angle camera is used to photograph people at the game table and around the game table. The field of view is wide. Therefore, with the image of the second target region acquired by means of the low-resolution wide-angle camera, people around the game table and actions thereof may be better identified. The combination of the high-resolution center camera and the low-resolution wide-angle camera may solve the problem that, when a single camera is used to acquire an image covering the game table region and people, the resolution of the center region and the coverage of the field of view cannot be satisfied simultaneously.

In some embodiments, a classifier may be used to detect an image of the first target region so as to identify each first target object in the image of the first target region, that is, target objects related to a game object, such as exchanged objects, exchanges, and cards, and a region corresponding to a first target object may be labeled in the image of the first target region by means of a bounding box. Moreover, the classifier may classify the regions respectively corresponding to the first target objects, and classify the first target objects related to the game object into a plurality of categories such as exchanged objects, exchanges, and cards. The classifier may be, for example, a deep convolutional neural network or the like.

In some embodiments, a classifier may be used to detect the image of the second target region so as to identify the body of a person appearing in the image of the second target region, including a face, a hand, and a body domain A region corresponding to a second target object is labeled in the image of the second target region by means of a bounding box. Moreover, the classifier may classify the regions respectively corresponding to the second target objects, and classify the second target objects into a plurality of categories such as a face, a body, and a hand.

If the first target object includes a target object related to the game object and the second target object includes a target object related to the player, the association relationship between the first target object and the second target object may be determined in the following manner.

First, according to position relationship between the first image acquisition apparatus and the second image acquisition apparatus, the first target object is mapped into the image of the second target region so as to obtain a corresponding mapped target object.

If the position relationship between the first image acquisition apparatus and the second image acquisition apparatus is known, the first target object is mapped into the image of the second target region according to internal parameters of the first image acquisition apparatus and internal parameters of the second image acquisition apparatus, so as to obtain a corresponding mapped target object. The position relationship between each target object related to the player and each mapped target object in the image of the second target region may reflect the position relationship between the game object corresponding to each first target object and the player in the actual space. Therefore, association relationship between each first target object and each target object related to the player may be determined according to the position of the target object related to the player and the position of a mapped target object corresponding to the first target object in the image of the second target region.

Figure 2A:
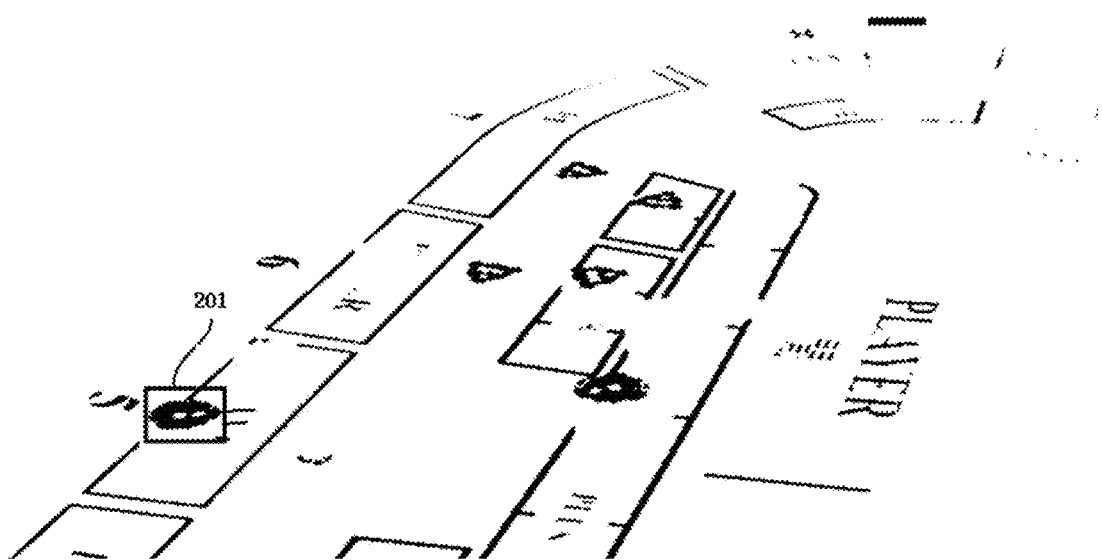
FIG. 2A shows an image of a first target region acquired by a first image acquisition apparatus in a target object identification system according to at least one embodiment of the present disclosure.
Figure 2B:
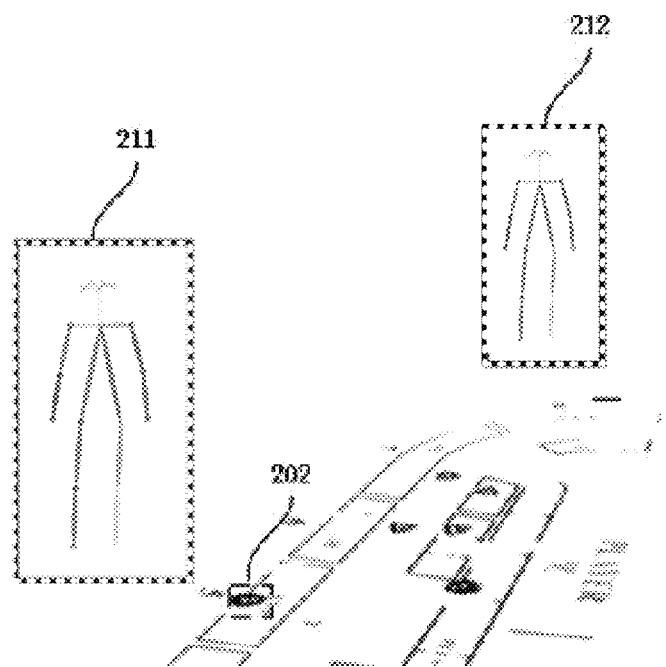
FIG. 2B shows an image of a second target region acquired by a second image acquisition apparatus in a target object identification system according to at least one embodiment of the present disclosure, where the image includes a mapped target object corresponding to a first target object in FIG. 2A.

FIG. 2A shows an image of a first target region acquired by the first image acquisition apparatus. A target object 201 related to a game object is obtained by identifying the image of the first target region. In FIG. 2A, the target object 201 related to the game object is a game chip. FIG. 2B shows an image of a second target region acquired by a second image acquisition apparatus. The second target region includes a game table region of the first target region, and also includes a player and dealer region around the game table region. Identification is performed based on the image of the second target region to obtain two target objects 211 and 212 related to the players.

According to the position relationship between the first image acquisition apparatus and the second image acquisition apparatus, and the internal parameters of the first image acquisition apparatus and the second image acquisition apparatus, the target object 201 related to the game object in FIG. 2A may be mapped into the image of the second target region, so as to obtain a corresponding mapped target object 202 (in a dashed box) in the image of the second target region as shown in FIG. 2B. Based on the respective positions of the target objects 211 and 212 and the position of the mapped target object 202 in the image of the second target region, the association relationship between the target objects 211 and 212 related to the players and the target object 201 related to the game object may be determined.

In some embodiments, the association relationship between each first target object related to the game object and each second target object related to the player may be determined in the following manner: if the distance between a target object related to the player and a mapped target object corresponding to a first target object in the image of the second target region is less than or equal to a first distance threshold, it may be determined that the first target object is associated with the target object related to the player. The distance may be determined, for example, based on the center position of the bounding box of the target object related to the player and the center position of the region of the mapped target object. For example, in FIG. 2B, the distance between the target object 211 related to the player and the mapped target object 202 corresponding to the target object 201 related to the game object is smaller than the first distance threshold. Therefore, it may be determined that the target object 211 related to the player may be associated with the target object 201 related to the game object. The specific value of the first distance threshold may be determined according to the type and number of target objects included in the second target region.

If the first target object includes a target object related to the game object, and the second target object includes a target object related to the game object and a target object related to the player, the association relationship between the first target object and the second target object may be determined in the following manner.

First, correspondence relationship between each first target object and each target object related to the game object in the image of the second target region is obtained according to the position relationship between the first image acquisition apparatus and the second image acquisition apparatus. For example, each first target object may be mapped into the image of the second target region to obtain the corresponding position of the first target object therein, and the correspondence relationship between each first target object and each target object related to the game object in the image of the second target region may be determined according to the distance between the target object related to the game object and the corresponding position of the first target object in the image of the second target region.

Next, association relationship between each first target object and each target object related to the player is determined according to the position of each target object related to the game object in the image of the second target region, the position of the target object related to the player in the image of the second target region, and the correspondence relationship between the first target object and the target object related to the game object in the image of the second target region.

In some embodiments, the association relationship between each first target object and each target object related to the player may be determined in the following manner: if the distance between a target object related to the player and a target object related to the game object in the image of the second target region is less than or equal to a second distance threshold, it may be determined that the target object related to the player is associated with the first target object corresponding to the target object related to the game object.

Figure 2C:
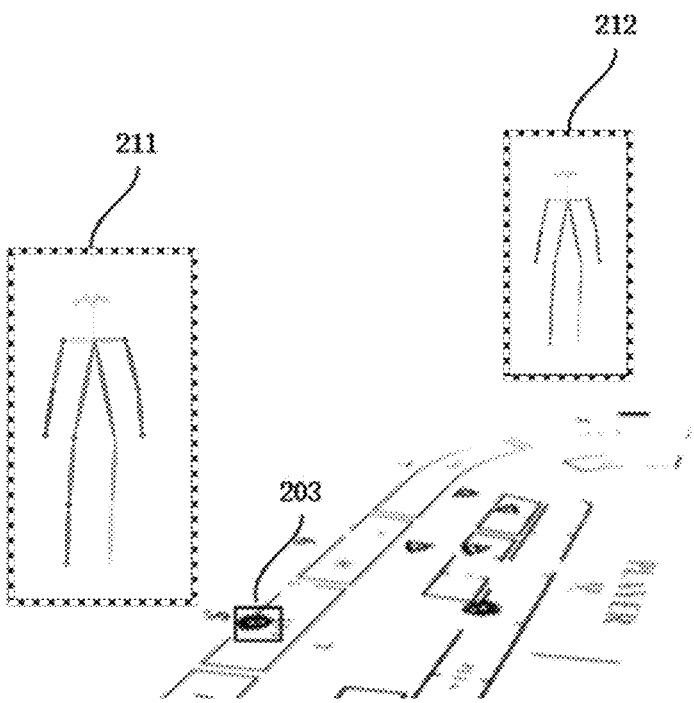
FIG. 2C shows an image of a second target region acquired by a second image acquisition apparatus in a target object identification system according to at least one embodiment of the present disclosure, where the image includes a target object related to a game object.

FIG. 2C shows an image of a second target region acquired by a second image acquisition apparatus. The image of the second target region includes the game table region in the first target region, and also includes the player and dealer region around the game table region. Two target objects 211 and 212 related to the player and a target object 203 related to the game object (for example, a game chip) are obtained by identifying the image of the second target region. The correspondence relationship between each first target object in FIG. 2A and each target object related to the game object in FIG. 2C may be obtained according to the position relationship between the first image acquisition apparatus and the second image acquisition apparatus, and the internal parameters of the first image acquisition apparatus and the second image acquisition apparatus.

In one example, each first target object in FIG. 2A may be mapped into the image of the second target region to obtain the corresponding position of the first target object therein. The correspondence relationship between the first target object and each target object related to the game object in the image of the second target region may be determined according to the distance between the target object related to the game object and the corresponding position of the first target object in the image of the second target region. For example, after all the first target objects in FIG. 2A are mapped into the image of the second target region shown in FIG. 2C, if the distance between the target object 203 related to the game object and the corresponding position of the first target object 201 in FIG. 2C is the shortest, it may be determined that the target object 203 related to the game object corresponds to the first target object 201.

If the distance between the target object 211 related to the player and the target object 203 related to the game object is less than or equal to a second distance threshold, it may be determined that the target object 211 related to the player is associated with the first target object 201 corresponding to the target object 203 related to the game object. The specific value of the second distance threshold may be determined according to the type and number of target objects included in the second target region.

In some embodiments, the target object related to the player may include one or more of a face, a body, and a hand. The processor is further configured to obtain identity information of a corresponding player by means of one or more of the face, the body, and the hand, and a first target object may be associated with the identity information of the player based on the association relationship between the target object related to the player and the first target object.

Figure 3A:
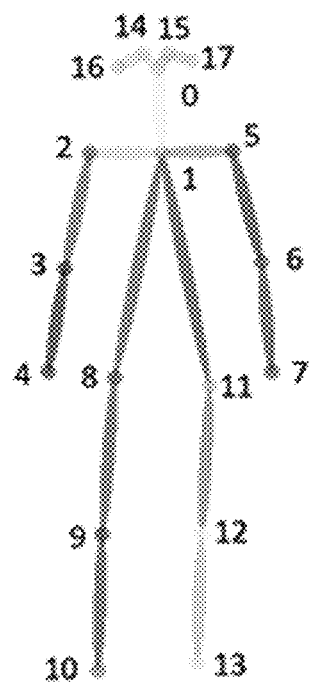
FIG. 3A is a schematic diagram of body key-point information obtained by a target object identification system according to at least one embodiment of the present disclosure.
Figure 3B:
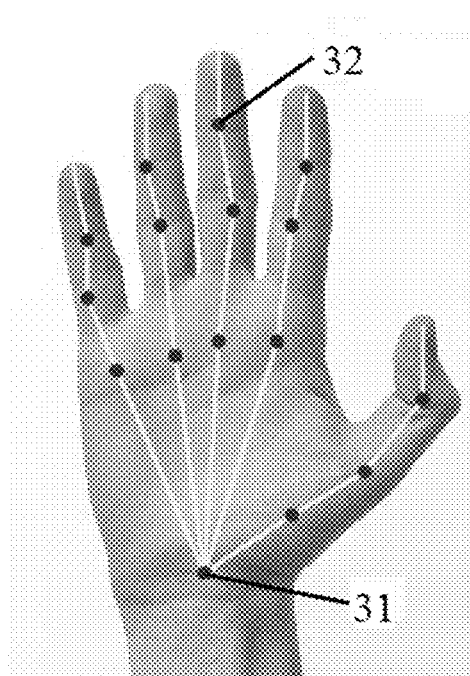
FIG. 3B is a schematic diagram of hand key-point information obtained by a target object identification system according to at least one embodiment of the present disclosure.

FIG. 3A is a schematic diagram of body key-point information obtained by a target object identification system according to at least one embodiment of the present disclosure. FIG. 3B is a schematic diagram of hand key-point information obtained by a target object identification system according to at least one embodiment of the present disclosure. As shown in FIG. 3A, a body may have key-points 0-17, including 4 head key-points, elbow key-points 3 and 6, hand key-points 4 and 7, etc. As shown in FIG. 3B, a hand may have 16 or 21 hand key-points, including hand key-points 31 and 32.

In response to that the target object related to the player includes a face, the identity information of the corresponding player may be obtained by means of the face, and each first target object may be associated with the identity information of a player based on the association relationship between the target object related to the player and the first target object.

In some embodiments, the identity information of the player corresponding to the face may be obtained in the following manner: obtaining face key-point information of the face in the image of the second target region; and determining the identity information of the player corresponding to the face according to the face key-point information. If the first target object associated with the face is known, it may be determined that the first target object is associated with the identity information of the player. For example, when it is determined that the face identified in the image of the second target region belongs to a certain player, and the name, gender, contact information, and other identity information of the player are known, the first target object associated with the face may be associated with the identity information, that is, a target object corresponding to the first target object and related to the game object, such as an exchanged object, an exchange, a card or the like, may be associated with the identity information.

In one example, the identity information of the player corresponding to the face may be determined according to the face key-point information in the following manner: comparing the face key-point information with the face image and/or face feature information of each reference person in a database, and determining the identity of a reference person matching the face key-point information as the identity of the person corresponding to the face. Moreover, the face key-point information and corresponding identity information may be determined as an identification result with respect to the face. For example, if the reference person that matches the face key-point information of face A (for example, the similarity is greater than or equal to a preset similarity threshold) is player M, face A is determined to be the face of the player M. In this way, the face features and identity of a person corresponding to the face may be determined.

In some embodiments, the identity information corresponding to each face may be determined at the beginning of the game. For example, if it is identified that a player approaches a game table and sits at a seat, it may be considered that the player is about to participate in the game, and the identity of the player may be identified and recorded, and the player may be tracked afterwards.

In some embodiments, face identification may be performed on an image of the second target region by means of a face identification network. The face identification network may be, for example, a deep convolutional neural network, which includes at least a convolution layer and a pooling layer (or a softmax layer). The present disclosure does not limit the network type and network structure of the face identification network.

In embodiments of the present disclosure, each first target object may be associated with the identity information of a player, so that the first target object may be monitored more effectively.

In response to that target objects related to the player include a face and a body, the identity information of the corresponding player may be obtained by means of the body, and each first target object may be associated with the identity information of a player based on the association relationship between the target object related to the player and the first target object.

In some embodiments, the identity information of the player corresponding to the body may be obtained in the following manner: obtaining face key-point information of each face in the image of the second target region, and determining, according to the face key-point information, identity information of a player corresponding to the face; obtaining body key-point information of each body in the image of the second target region; determining a face associated with each body according to the face key-point information of each face and the body key-point information of the body; and then determining the identity information of a player corresponding to each body according to the identity information of a player corresponding to a face associated with the body. Thus, each first target object may be associated with the identity information of a player according to the association relationship between the first target object and each body and the identity information of the player corresponding to the body.

Regarding the body, body identification may be performed on the image of the second target region to obtain the body key-point information of each body, such as body key-points 0-13 respectively corresponding to 14 joint parts as shown in FIG. 3A, as a body identification result.

In some embodiments, the image of the second target region may be processed by means of a body identification network to obtain a body identification result. The body identification network may be, for example, a deep convolutional neural network. The present disclosure does not limit the network type and network structure of the body identification network.

With both the face key-point information of each face and the body key-point information of each body obtained, each face may be associated with a body. For example, if the area of an overlapping region between a region where face key-points of face A are located and a region where body key-points of body B are located is greater than or equal to a preset area threshold, it may be considered that face A is associated with body B. That is, face A and body B may correspond to the same player M. In this case, the identity information corresponding to face A may be determined as the identity information corresponding to body B, that is, body B is the body of player M. In this way, the face is associated with the body, so that the identity information corresponding to the body may be determined according to the identity information corresponding to the face, thereby improving the efficiency and accuracy of identification.

In some embodiments, the face is associated with the body in the following manner: if the area of an overlapping region between a region where face key-points of one face are located and a region where body key-points of one body are located is greater than or equal to a first area threshold, determining that the face is associated with the body. Persons skilled in the art may set the first area threshold according to actual conditions, and the present disclosure does not limit the specific value of the first area threshold.

In the embodiments of the present disclosure, both the association relationship between each first target object and each body and the identity information of a player corresponding to each body may be determined, thereby associating each first target object with the identity information of a player. Generally, the body of a player is closer to the first target object related to the game object than the face of the player, so that the accuracy of the association between the first target object and the identity information of the player may be improved.

In response to that target objects related to the player include a face and a hand, the identity information of the corresponding player may be obtained by means of the hand, and each first target object may be associated with the identity information of a player based on the association relationship between the target object related to the player and the first target object.

In some embodiments, the identity information of the player corresponding to the hand may be obtained in the following manner: obtaining face key-point information of each face in the image of the second target region, and determining, according to the face key-point information, identity information of a player corresponding to the face; determining a hand associated with each face according to the position of the face and the position of each hand in the image of the second target region; and then determining identity information of a player corresponding to each hand according to the identity information of a player corresponding to a face associated with the hand. Thus, each first target object may be associated with the identity information of a player according to the association relationship between the first target object and each hand and the identity information of the player corresponding to the hand.

In some embodiments, a face and a hand may be associated with each other in the following manner: if the distance between the position of a face and the position of a hand is less than or equal to a third distance threshold, it may be determined that the face is associated with the hand. Persons skilled in the art may set the third distance threshold according to actual conditions, and the present disclosure does not limit the specific value of the third distance threshold.

In the embodiments of the present disclosure, both the association relationship between each first target object and each hand and the identity information of a player corresponding to each hand may be determined, thereby associating each first target object with the identity information of a player. Generally, the hand of a player is closer to the first target object related to the game object than the face of the player, so that the accuracy of the association between the first target object and the identity information of the player may be improved.

In response to that target objects related to the player include a face, a body, and a hand, the identity information of the corresponding player may be obtained by means of the hand, and each first target object may be associated with the identity information of a player based on the association relationship between the target object related to the player and the first target object and the identity information of the player corresponding to each hand.

In some embodiments, the identity information of the player corresponding to the hand may be obtained in the following manner: obtaining face key-point information of each face in the image of the second target region, and determining, according to the face key-point information, identity information of a player corresponding to the face; obtaining body key-point information of each body in the image of the second target region, and hand key-point information of each hand in the image of the second target region; determining a face associated with each body according to the face key-point information of each face and the body key-point information of the body, as described above; determining the identity information of a player corresponding to each body according to the identity information of a player corresponding to a face associated with the body; determining a body associated with each hand according to the body key-point information of each body and the hand key-point information of the hand; and then determining the identity information of a player corresponding to each hand according to the identity information of a player corresponding to a body associated with the hand. Thus, each first target object may be associated with the identity information of a player according to the association relationship between the first target object and each hand and the identity information of the player corresponding to the hand.

Regarding the hand, hand identification may be performed on the image of the second target region to obtain the hand key-point information of each hand, as shown in FIG. 3B, as a hand identification result.

In some embodiments, the image of the second target region may be processed by means of a hand identification network to obtain a hand identification result. The hand identification network may be, for example, a deep convolutional neural network. The present disclosure does not limit the network type and network structure of the hand identification network.

Each hand may be associated with a body according to the body key-point information of each body and the hand key-point information of the hand. For example, if the body key-point information of body B and the hand key-point information of hand C satisfy a preset condition, it may be considered that body B is associated with hand C, that is, body B and hand C may correspond to the same player M. In this case, the identity information corresponding to body B may be determined as the identity information corresponding to hand C, that is, the hand C is the hand of player M.

For example, the preset condition may be: an area of an overlapping region between a region where body key-points of body B are located and a region where hand key-points of hand C are located is greater than or equal to a preset area threshold; the distance between the region where the body key-points of body B are located and the region where the hand key-points of hand C are located is less than or equal to a preset distance threshold; or an angle between a first connecting line between an elbow key-point (e.g., the elbow key-point 3 or 6 in FIG. 3A) and a hand key-point (e.g., the hand key-point 4 or 7 in FIG. 3A) of the body key-points of body B and a second connecting line between certain hand key-points (e.g., the hand key-point 31 and 32 in FIG. 3B) of hand C is within a preset angle range. The present disclosure does not limit the preset conditions for determining the association between the body and the hand.

In some embodiments, the preset condition includes at least one of the following: the area of an overlapping region between a region where body key-points of one body are located and a region where hand key-points of one hand are located is greater than or equal to a second area threshold; the distance between the region where body key-points of one body are located and the region where hand key-points of one hand are located is less than or equal to a fourth distance threshold; and an angle between a first connecting line of the body key-point information of one body and a second connecting line of the hand key-point information of one hand is less than or equal to an angle threshold, where the first connecting line is a connecting line between an elbow key-point and a hand key-point in the body key-points of the body, and the second connecting line is a connecting line between hand key-points corresponding to the hand.

For example, for any one body and any one hand, the relationship between the body key-point information of the body and the hand key-point information of the hand may be analyzed.

In one case, an area of an overlapping region between a region where the body key-points of the body are located and a region where the hand key-points of the hand are located may be calculated. If the area is greater than or equal to a preset second area threshold, it may be determined that the body is associated with the hand. Persons skilled in the art may set the second area threshold according to actual conditions, and the present disclosure does not limit the specific value of the second area threshold.

In one case, the distance between the region where the body key-points of the body are located and the region where the hand key-points of the hand are located (for example, the distance between the center point of the body and the center point of the hand) may be calculated. If the distance is less than or equal to a preset fourth distance threshold, it may be determined that the body is associated with the hand. Persons skilled in the art may set the fourth distance threshold according to actual conditions, and the present disclosure does not limit the specific value of the fourth distance threshold.

In one case, an angle between a first connecting line between body key-points (e.g., an elbow key-point and a hand key-point) of the body and a second connecting line between hand key-points of the hand may be calculated. If the angle is less than or equal to a preset angle threshold, it may be determined that the body is associated with the hand. Persons skilled in the art may set the angle threshold according to actual conditions, and the present disclosure does not limit the specific value of the angle threshold.

In some embodiments, a hand associated with each first target object may be determined according to the position of each hand and the position of the first target object. Furthermore, according to the association between the hand and the first target object, the identity information of the player associated with the first target object may be determined.

For example, if the distance between the position of hand C and the position of first target object D is less than or equal to a preset distance threshold, it may be considered that hand C is associated with first target object D, that is, the hand C and the first target object D correspond to the same player. In this case, it may be determined that first target object D is associated with player M corresponding to hand C, for example, an exchanged object corresponding to first target object D is betted by player M.

In the embodiments of the present disclosure, the identity information of the corresponding player may be obtained based on the association relationship between the hand and the body and the association relationship between the body and the face. Generally, the association between the hand and the body is closer than the association between the hand and the face, so that the accuracy of the association between the first target object and the identity information of the player may be improved.

In some embodiments, each second target object related to the player in the image of the second target region may be further associated with a seat region corresponding to the game table, and each first target object may be further associated with a seat region corresponding to a second target object.

In a scenario where the seat regions corresponding to the game table have one-to-one correspondence with the players, each second target object may be associated with a seat region. For example, eight seat regions corresponding to the game table may be sequentially numbered as: No. 1, No. 2, . . . and No. 8. For each second target object identified in the image of the second target region, the correspondence relationship between the second target object and each of the eight seat regions may be determined according to the position of the second target object and the position of the seat region. If a second target object corresponds to seat region No. 2, the second target object may be associated with seat region No. 2, i.e., associated with a player at the game table corresponding to seat region No. 2.

Figure 4:
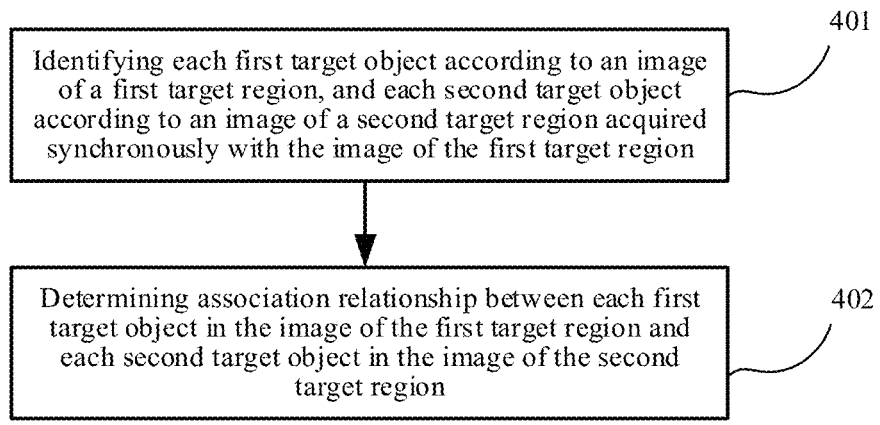
FIG. 4 is a flowchart of a target object identification method according to at least one embodiment of the present disclosure.

FIG. 4 is a flowchart of a target object identification method according to at least one embodiment of the present disclosure. The target object identification method may be performed by the target object identification system described above with reference to FIGS. 1-3B. Alternatively, the target object identification method may be performed by an electronic device such as a terminal device or a server. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. For example, the method may be implemented by a processor by invoking computer-readable instructions stored in a memory, and the specific implementation method may refer to the aforementioned target object identification system, and details are not described herein again.

As shown in FIG. 4, the method may include steps 401 and 402.

At step 401, each first target object is identified based on an image of a first target region, and each second target object is identified based on an image of a second target region which is acquired synchronously with the image of the first target region. The first target object is a target object in the first target region, and the second target object is a target object in the second target region.

For example, the image of the first target region is acquired by means of a first image acquisition apparatus, the image of the second target region is acquired by means of the second image acquisition apparatus, and the second target region includes part or all of the first target region. The resolution of the first image acquisition apparatus is higher than that of the second image acquisition apparatus, and the field of view of the second image acquisition apparatus is greater than that of the first image acquisition apparatus.

At step 402, association relationship between each first target object in the image of the first target region and each second target object in the image of the second target region is determined.

In some embodiments, the first target object includes a target object related to a game object, and the second target object includes a target object related to a player. The determining of the association relationship between each first target object in the image of the first target region and each second target object in the image of the second target region may include: mapping each first target object into the image of the second target region according to position relationship between the first image acquisition apparatus and the second image acquisition apparatus, so as to obtain a corresponding mapped target object; and determining association relationship between each first target object and each target object related to the player according to the position of the target object related to the player and the position of a mapped target object corresponding to the first target object in the image of the second target region. For example, if the distance between a target object related to the player and a mapped target object corresponding to a first target object in the image of the second target region is less than or equal to a first distance threshold, it may be determined that the first target object is associated with the target object related to the player.

In some embodiments, the first target object includes a target object related to a game object, and the second target objects include a target object related to a game object and a target object related to a player. The determining of the association relationship between each first target object in the image of the first target region and each second target object in the image of the second target region may include: obtaining correspondence relationship between each first target object and each target object related to the game object in the image of the second target region according to the position relationship between the first image acquisition apparatus and the second image acquisition apparatus; and determining association relationship between each first target object and each target object related to the player according to the position of each target object related to the game object in the image of the second target region, the position of the target object related to the player in the image of the second target region, and the correspondence relationship between the first target object and the target object related to the game object in the image of the second target region. For example, if the distance between a target object related to the player and a target object related to the game object in the image of the second target region is less than or equal to a second distance threshold, it may be determined that the target object related to the player is associated with a first target object corresponding to the target object related to the game object.

In some embodiments, the target object related to the player includes a face. The determining of the association relationship between each first target object and each target object related to the player may include: determining association relationship between each first target object and each face; obtaining face key-point information of each face in the image of the second target region, and determining identity information of a player corresponding to the face according to the face key-point information; and associating each first target object with the identity information of a player according to the association relationship between the first target object and each face and the identity information of a player corresponding to the face.

In some embodiments, the target objects related to the player include a face and a body. The determining of the association relationship between each first target object and each target object related to the player may include: determining association relationship between each first target object and each body; obtaining face key-point information of each face in the image of the second target region, and determining, according to the face key-point information, identity information of a player corresponding to the face; obtaining body key-point information of each body in the image of the second target region; determining a face associated with each body according to the face key-point information of each face and the body key-point information of the body; determining identity information of a player corresponding to each body according to the identity information of a player corresponding to a face associated with the body; and associating each first target object with the identity information of a player according to the association relationship between the first target object and each body and the identity information of the player corresponding to the body.

In some embodiments, the target objects related to the player include a face and a hand. The determining of the association relationship between each first target object and each target object related to the player may include: determining association relationship between each first target object and each hand; obtaining face key-point information of each face in the image of the second target region, and determining, according to the face key-point information, identity information of a player corresponding to the face; determining a hand associated with each face according to the position of the face and the position of each hand in the image of the second target region; determining identity information of a player corresponding to each hand according to the identity information of a player corresponding to a face associated with the hand; and associating each first target object with the identity information of a player according to the association relationship between the first target object and each hand and the identity information of a player corresponding to the hand.

In some embodiments, if the distance between the position of a face and the position of a hand in the image of the second target region is less than or equal to a third distance threshold, it may be determined that the face is associated with the hand.

In some embodiments, the target objects related to the player include a face, a body, and a hand. The determining of the association relationship between each first target object and each target object related to the player may include: determining association relationship between each first target object and each hand; obtaining face key-point information of each face in the image of the second target region, and determining, according to the face key-point information, identity information of a player corresponding to the face; obtaining body key-point information of each body in the image of the second target region; obtaining hand key-point information of each hand in the image of the second target region; determining a face associated with each body according to the face key-point information of each face and the body key-point information of the body; determining the identity information of a player corresponding to each body according to the identity information of a player corresponding to a face associated with the body; determining a body associated with each hand according to the body key-point information of each body and the hand key-point information of the hand; determining the identity information of a player corresponding to each hand according to the identity information of a player corresponding to a body associated with the hand; and associating each first target object with the identity information of a player according to the association relationship between the first target object and each hand and the identity information of a player corresponding to the hand.

In some embodiments, if the area of an overlapping region between a region where face key-points of a face are located and a region where body key-points of a body are located is greater than or equal to a first area threshold, it may be determined that the face is associated with the body.

In some embodiments, if body key-point information of a body and hand key-point information of a hand satisfy a preset condition, it may be determined that the body is associated with the hand. For example, the preset condition may include at least one of the following: the area of an overlapping region between a region where body key-points of a body are located and a region where hand key-points of a hand are located is greater than or equal to a second area threshold; the distance between the region where body key-points of a body are located and the region where hand key-points of a hand are located is less than or equal to a fourth distance threshold; and an angle between a first connecting line of a body and a second connecting line of a hand is less than or equal to an angle threshold, where the first connecting line is a connecting line between an elbow key-point and a hand key-point of body key-points of the body, and the second connecting line is a connecting line between hand key-points of the hand.

Figure 5:
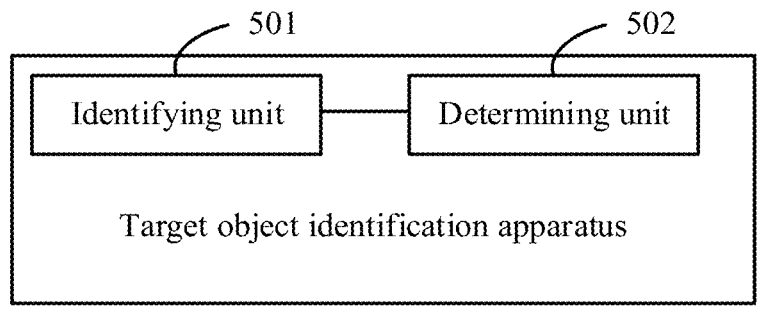
FIG. 5 is a schematic block diagram of a target object identification apparatus according to at least one embodiment of the present disclosure.

FIG. 5 is a schematic block diagram of a target object identification apparatus according to at least one embodiment of the present disclosure. The apparatus may be configured to perform the target object identification method described above with reference to FIG. 4, and may include an identifying unit 501 and a determining unit 502.

The identifying unit 501 is configured to identify each first target object according to an image of a first target region, and identify each second target object according to an image of a second target region which is acquired synchronously with the image of the first target region. The first target object is a target object in the first target region, and the second target object is a target object in the second target region.

For example, the image of the first target region is acquired by means of a first image acquisition apparatus, the image of the second target region is acquired by means of a second image acquisition apparatus, and the second target region includes part or all of the first target region. The resolution of the first image acquisition apparatus is higher than that of the second image acquisition apparatus, and the field of view of the second image acquisition apparatus is greater than that of the first image acquisition apparatus.

The determining unit 502 is configured to determine association relationship between each first target object in the image of the first target region and each second target object in the image of the second target region.

Figure 6:
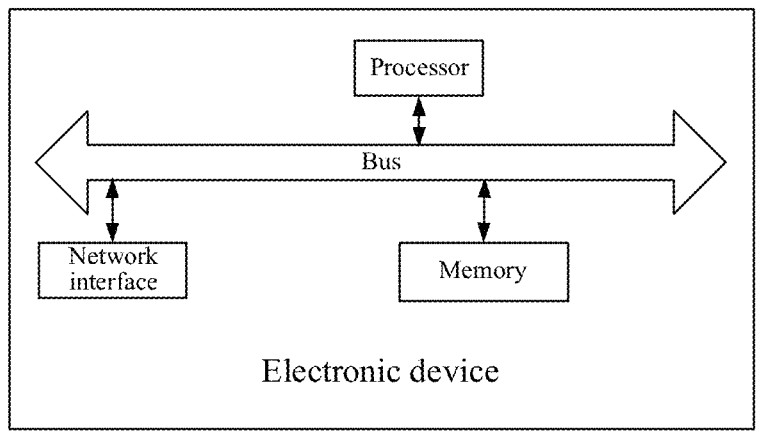
FIG. 6 is a schematic block diagram of an electronic device according to at least one embodiment of the present disclosure.

FIG. 6 is a schematic block diagram of an electronic device according to at least one embodiment of the present disclosure. The electronic device may include: a processor; and a memory storing instructions executable by the processor, where the processor is configured to execute the instructions to implement the target object identification method according to at least one embodiment.

The present disclosure may further provide a computer-readable storage medium having computer program instructions stored thereon. When executed by a processor, the computer program instructions may cause the processor to implement the target object identification method according to at least one embodiment is implemented.

Persons skilled in the art should understand that one or more embodiments of the present disclosure may be provided as methods, systems, or computer program products. Therefore, one or more embodiments of the present disclosure may be in the form of a full hardware embodiment, a full software embodiment, or a combination of software and hardware embodiments. Moreover, one or more embodiments of the present disclosure n may be in the form of a computer program product implemented on one or more computer usable storage media (including but not limited to a disk memory, a CD-ROM, an optical memory, etc.) having computer usable program codes stored therein.

The embodiments of the present disclosure also provide a computer-readable storage medium, having computer programs stored hereon. When the programs are executed by a processor, steps of a method for identifying a target object described in any embodiment of the present disclosure are implemented, and/or steps of a method for training a neural network of a target object described in any embodiment of the present disclosure are implemented. The "and/or" means having at least one of two features, for example, "A and/or B" includes three solutions: A, B, and "A and B".

One or more embodiments in the present disclosure are described in a progressive manner, and the same or similar portions between the various embodiments may be referred to each other, and each embodiment focuses on the differences from other embodiments. In particular, the data processing device embodiment is basically similar to the method embodiment, the description is relatively simple, and the relevant parts may be referred to the description of the method embodiment.

The above describes specific embodiments of the present disclosure. There may be other embodiments within the scope of the appended claims. In some cases, the actions or steps recited in the claims may be performed in a different order than the embodiments and may still achieve the desired results. In addition, the processes depicted in the drawings are not necessarily in a particular order or in a sequential order to achieve the desired results. In some embodiments, multi-task processing and parallel processing are also possible or may be advantageous.

Embodiments of the subject matter and functional operations described in the specification may be implemented in the following: digital electronic circuits, tangibly embodied computer software or firmware, computer hardware including the structures disclosed in the specification and the structural equivalents thereof, or a combination of one or more of the foregoing elements. Embodiments of the subject matter described in the specification may be implemented as one or more computer programs, that is, one or more modules in computer program instructions encoded on a tangible non-transitory program carrier to be executed by a data processing device or in the computer program instructions controlling operations of the data processing apparatus. Alternatively or additionally, the program instructions may be encoded on a manually generated propagation signal, such as a machine-generated electrical, optical, or electromagnetic signal, which is generated to encode and transmit the information to a suitable receiver apparatus to be executed by the data processing apparatus. The computer storage medium may be a machine-readable storage device, a machine-readable storage substrate, a random or serial access memory device, or a combination of one or more of the foregoing devices.

The processing and logic flow described in the specification may be performed by one or more programmable computers executing one or more computer programs to perform corresponding functions by operating on input data and generating an output. The processing and logic flow may also be performed by a dedicated logic circuit, such as a Field Programmable Gate Array (FPGA) or an Application Specific Integrated Circuit (ASIC), and the apparatus may also be implemented as a dedicated logic circuit.

Computers suitable for executing a computer program include, for example, a general-purpose and/or special-purpose microprocessor, or any other type of central processing unit. Generally, the central processing unit receives instructions and data from a read-only memory (ROM) and/or a random access memory (RAM). The basic components of a computer include a central processing unit for implementing or executing instructions and one or more memory devices for storing instructions and data. Generally, the computer also includes one or more mass storage devices, such as magnetic disks, magneto-optical disks, or optical disks, for storing data, or the computer is operatively coupled to the mass storage device to receive data from the mass storage device or transmit data to the mass storage device, or both. However, the computer does not necessarily have such a device. In addition, the computer may be embedded in another device, such as a mobile phone, a Personal Digital Assistant (PDA), a mobile audio or video player, a game console, a Global Positioning System (GPS) receiver, or, a portable storage device, for example, a Universal Serial Bus (USB) flash drive, to name a few.

Computer-readable media suitable for storing computer program instructions and data include all forms of non-volatile memory, media, and memory devices, including, for example, semiconductor memory devices (such as EPROM, EEPROM, and flash memory devices), magnetic disks (such as internal hard disks or removable disks), magneto-optical disks, and CD ROM and DVD-ROM disks. The processor and the memory may be supplemented by, or incorporated in, a special-purpose logic circuit.

Although the specification contains many specific implementation details, these details should not be construed as limiting the present disclosure, but rather are mainly used to describe the features of specific embodiments of the present disclosure. Certain features that are described in the specification in multiple embodiments may also be implemented in combination in a single embodiment. On the other hand, various features described in a single embodiment may also be implemented separately in multiple embodiments or in any suitable sub-combination. In addition, although features may function in certain combinations as described above and are even so initially claimed, one or more features from the claimed combination may, in some cases, be removed from the combination, and the claimed combination may point to a sub-combination or a variant of the sub-combination.

Similarly, although the operations are depicted in a particular order in the drawings, this should not be construed as requiring these operations to be performed in the specific order shown or sequentially, or that all illustrated operations be performed to achieve the desired result. In some cases, multitasking and parallel processing may be advantageous. In addition, the separation of various system modules and components in the foregoing embodiments should not be understood as requiring such separation in all embodiments, and it should be understood that the described program components and systems may generally be integrated together in a single software product, or packaged into multiple software products.

Therefore, specific embodiments of the subject matter have been described. Other embodiments are within the scope of the appended claims. In some cases, the actions recited in the claims may be performed in a different order and still achieve the desired result. In addition, the processes depicted in the drawings are not necessarily required to be in the specific order or sequence shown to achieve a desired result. In some implementations, multitasking and parallel processing may be advantageous.

Some embodiments of the present disclosure are described above, and shall not be interpreted as limitation to the present disclosure. Any modification, alteration or equivalent substitution, which may be made based on the spirit and principle of the present disclosure, should fall within the scope of the present disclosure.

The invention claimed is:

1. A target object identification system, comprising a first image acquisition apparatus, a second image acquisition apparatus, and a processor, wherein:

the first image acquisition apparatus is configured to acquire a first image of a first target region, the second image acquisition apparatus is configured to synchronously acquire a second image of a second target region, and the second target region comprises all of the first target region, the first image is a view of key regions in the first target region comprising first target objects, the second image is a view of a global scope for the second target region comprising second target objects, and the first target objects are different from the second target objects;

a resolution of the first image acquisition apparatus is higher than a resolution of the second image acquisition apparatus, and a field of view of the second image acquisition apparatus is greater than a field of view of the first image acquisition apparatus; and the processor is configured to:
identify the first target objects in the first target region according to the first image of the first target region by using a first classifier, and classify the first target objects in the first target region into a plurality of first categories;

identify the second target objects in the second target region according to the second image of the second target region by using a second classifier, and classify the second target objects in the second target region into a plurality of second categories, wherein the plurality of second categories is different than the plurality of first categories; and determine association relationships between the first target objects of the plurality of first categories in the first image of the first target region acquired by the first image acquisition apparatus and the second target objects of the plurality of second categories in the synchronously acquired second image of the second target region acquired by the second image acquisition apparatus.

2. The system according to claim 1, wherein the determining the association relationships between the first target objects of the plurality of first categories in the first image of the first target region acquired by the first image acquisition apparatus and the second target objects of the plurality of second categories in the synchronously acquired second image of the second target region acquired by the second image acquisition apparatus comprises:

for each first target object of the first target objects, mapping the first target object into the second image of the second target region according to a position relationship between the first image acquisition apparatus and the second image acquisition apparatus, to obtain a mapped target object corresponding to the first target object; and determining the association relationships between the first target objects of the plurality of first categories and the second target objects of the plurality of second categories according to positions of the second target objects in the second image of the second target region and positions of mapped target objects corresponding to the first target objects in the second image of the second target region.

3. The system according to claim 2, wherein the determining the association relationships between the first target objects of the plurality of first categories and the second target objects of the plurality of second categories comprises:

for each first target object of the first target objects, if a distance between one of the second target objects and the mapped target object corresponding to the first target object in the second image of the second target region is less than or equal to a first distance threshold, determining that the first target object is associated with the one of the second target objects.

4. The system according to claim 1, wherein
the plurality of second categories of the second target objects comprise a category of target objects related to game objects in a game and a category of target objects representing players in the game; and
the determining the association relationships between the first target objects of the plurality of first categories in the first image of the first target region acquired by the first image acquisition apparatus and the second target objects of the plurality of second categories in the synchronously acquired second image of the second target region acquired by the second image acquisition apparatus comprises:
  obtaining correspondence relationships between the first target objects and the target objects related to the game objects in the second image of the second target region according to a position relationship between the first image acquisition apparatus and the second image acquisition apparatus; and
  determining association relationships between the first target objects and the target objects representing the players according to positions of the target objects related to the game objects in the second image of the second target region, positions of the target objects representing the players in the second image of the second target region, and the correspondence relationships between the first target objects and the target objects related to the game objects in the second image of the second target region.

5. The system according to claim 4, wherein the determining the association relationships between the first target objects and the target objects representing the players comprises:
  if a distance between one of the target objects representing the players and one of the target objects related to the game objects in the second image of the second target region is less than or equal to a second distance threshold, determining that the one of the target objects representing the players is associated with one of the first target objects corresponding to the one of the target objects related to the game objects.

6. The system according to claim 1, wherein
the plurality of second categories of the second target objects comprise a category of target objects representing players in a game, and the target objects representing the players comprise faces; and
the processor is further configured to:
  determine association relationships between the first target objects and the faces;
  for each face of the faces, obtain face key-point information of the face in the second image of the second target region, and determine identity information of one of the players corresponding to the face according to the face key-point information; and
  associate the first target objects with identity information of the players according to the identity information of the players corresponding to the faces and the association relationships between the first target objects and the faces.

7. The system according to claim 1, wherein
the plurality of second categories of the second target objects comprise a category of target objects representing players in a game, and the target objects representing the players comprise faces and bodies; and
the processor is further configured to:
  determine association relationships between the first target objects and the bodies;
  for each face of the faces, obtain face key-point information of the face in the second image of the second target region, and determine, according to the face key-point information, identity information of one of the players corresponding to the face;
  for each body of the bodies, obtain body key-point information of the body in the second image of the second target region, determine one of the faces associated with the body according to the face key-point information of each of the faces and the body key-point information of the body, and determine identity information of one of the players corresponding to the body according to the identity information of one of the players corresponding to one of the faces associated with the body; and
  associate the first target objects with the identity information of the players corresponding to the bodies according to the identity information of the players corresponding to the bodies and the association relationships between the first target objects and the bodies.

8. The system according to claim 7, wherein the determining the one of the faces associated with the body according to the face key-point information of each of the faces and the body key-point information of the body comprises:
  if an area of an overlapping region between a region where face key-points of one of the faces are located and a region where body key-points of the body are located is greater than or equal to a first area threshold, determining that the one of the faces is associated with the body.

9. The system according to claim 1, wherein
the plurality of second categories of the second target objects comprise a category of target objects representing players in a game, and the target objects representing the players comprise faces and hands; and
the processor is further configured to:
  determine association relationships between the first target objects and the hands;
  for each face of the faces, obtain face key-point information of the face in the second image of the second target region, determine, according to the face key-point information, identity information of one of the players corresponding to the face, and determine one of the hands associated with the face according to a position of the face and positions of the hands in the second image of the second target region;
  for each hand of the hands, determine identity information of one of the players corresponding to the hand according to the identity information of one of the players corresponding to one of the faces associated with the hand; and
  associate the first target objects with the identity information of the players corresponding to the hands according to the identity information of the players corresponding to the hands and the association relationships between the first target objects and the hands.

10. The system according to claim 9, wherein the determining the one of the hands associated with the face according to the position of the face and the positions of the hands in the second image of the second target region comprises:

if a distance between the position of the face and a position of the one of the hands in the second image of the second target region is less than or equal to a third distance threshold, determining that the face is associated with the one of the hands.

11. The system according to claim 1, wherein
the plurality of second categories of the second target objects comprise a category of target objects representing players in a game, and the target objects representing the players comprise faces, bodies, and hands; and
the processor is further configured to:
   determine association relationships between the first target objects and the hands;
   for each face of the faces, obtain face key-point information of the face in the second image of the second target region, and determine, according to the face key-point information, identity information of one of the players corresponding to the face;
   obtain body key-point information of each of the bodies in the second image of the second target region;
   obtain hand key-point information of each of the hands in the second image of the second target region;
   for each body of the bodies, determine one of the faces associated with the body according to the face key-point information of each of the faces and the body key-point information of the body, determine identity information of one of the players corresponding to the body according to the identity information of one of the players corresponding to one of the faces associated with the body;
   for each hand of the hands, determine one of the bodies associated with the hand according to the body key-point information of each of the bodies and the hand key-point information of the hand, determine identity information of one of the players corresponding to the hand according to the identity information of one of the players corresponding to one of the bodies associated with the hand; and
   associate the first target objects with the identity information of the players according to the identity information of the players corresponding to the hands and the association relationships between the first target objects and the hands.

12. The system according to claim 11, wherein the determining the one of the bodies associated with the hand comprises:
   if body key-point information of the one of the bodies and hand key-point information of the hand satisfy a preset condition, determining that the one of the bodies is associated with the hand,
   wherein the preset condition comprises at least one of:
      an area of an overlapping region between a region where body key-points of the one of the bodies are located and a region where hand key-points of the hand are located is greater than or equal to a second area threshold;
      a distance between the region where the body key-points of the one of the bodies are located and the region where the hand key-points of the hand are located is less than or equal to a fourth distance threshold; or
      an angle between a first connecting line of the one of the bodies and a second connecting line of the hand is less than or equal to an angle threshold, wherein the first connecting line is a connecting line between an elbow key-point and a hand key-point of the body key-points of the one of the bodies, and the second connecting line is a connecting line between the hand key-points of the hand.

13. The system according to claim 11, wherein the determining the one of the faces associated with the body according to the face key-point information of each of the faces and the body key-point information of the body comprises:
   if an area of an overlapping region between a region where face key-points of one of the faces are located and a region where body key-points of the body are located is greater than or equal to a first area threshold, determining that the one of the faces is associated with the body.

14. A target object identification method, comprising:
   identifying first target objects in a first target region according to a first image of the first target region by using a first classifier, and classifying the first target objects in the first target region into a plurality of first categories;
   identifying second target objects in a second target region according to a second image of the second target region by using a second classifier, and classifying the second target objects in the second target region into a plurality of second categories, wherein the plurality of first categories is different than the plurality of second categories, and the second image of the second target region is acquired synchronously with the first image of the first target region; and
   determining association relationships between the first target objects of the plurality of first categories in the first image of the first target region acquired by a first image acquisition apparatus and the second target objects of the plurality of second categories in the second image of the second target region synchronously acquired by a second image acquisition apparatus,
   wherein the second target region comprises all of the first target region, the first image is a view of key regions in the first target region comprising the first target objects, the second image is a view of a global scope for the second target region comprising the second target objects, and the first target objects are different from the second target objects; and
   a resolution of the first image acquisition apparatus is higher than a resolution of the second image acquisition apparatus, and a field of view of the second image acquisition apparatus is greater than a field of view of the first image acquisition apparatus.

15. The method according to claim 14, wherein the determining the association relationships between the first target objects of the plurality of first categories in the first image of the first target region acquired by the first image acquisition apparatus and the second target objects of the plurality of second categories in the second image of the second target region synchronously acquired by the second image acquisition apparatus comprises:
   for each first target object of the first target objects, mapping the first target object into the second image of the second target region according to a position relationship between the first image acquisition apparatus and the second image acquisition apparatus, to obtain a mapped target object corresponding to the first target object; and
   determining the association relationships between the first target objects of the plurality of first categories and the second target objects of the plurality of second categories according to positions of the second target objects in the second image of the second target region and positions of mapped target objects corresponding to the first target objects in the second image of the second target region.

16. The method according to claim 15, wherein the determining the association relationships between the first target objects of the plurality of first categories and the second target objects of the plurality of second categories according to positions of the second target objects in the second image of the second target region and the positions of the mapped target objects corresponding to the first target objects in the second image of the second target region comprises:

for each first target object of the first target objects, if a distance between one of the second target objects and the mapped target object corresponding to the first target object in the second image of the second target region is less than or equal to a first distance threshold, determining that the first target object is associated with the one of the second target objects.

17. The method according to claim 14, wherein the plurality of second categories of the second target objects comprise a category of target objects related to game objects in a game and a category of target objects representing players in the game; and the determining the association relationships between the first target objects of the plurality of first categories in the first image of the first target region acquired by the first image acquisition apparatus and the second target objects of the plurality of second categories in the second image of the second target region synchronously acquired by the second image acquisition apparatus comprises:

obtaining correspondence relationships between the first target objects and the target objects related to the game objects in the second image of the second target region according to a position relationship between the first image acquisition apparatus and the second image acquisition apparatus; and determining association relationships between the first target objects and the target objects representing the players according to positions of the target objects related to the game objects in the second image of the second target region, positions of the target objects representing the players in the second image of the second target region, and the correspondence relationships between the first target objects and the target objects related to the game objects in the second image of the second target region.

18. The method according to claim 17, wherein the determining the association relationships between the first target objects and the target objects representing the players comprises:

if a distance between one of the target objects representing the players and one of the target objects related to the game objects in the second image of the second target region is less than or equal to a second distance threshold, determining that the one of the target objects representing the players is associated with one of the first target objects corresponding to the one of the target objects related to the game objects.

19. A non-transitory computer-readable storage medium having computer program instructions stored thereon, wherein the computer program instructions, when executed by a processor, cause the processor to implement the method according to claim 14.

20. An electronic device, comprising:

a processor; and a memory storing instructions that are executable by the processor to perform operations comprising:

identifying first target objects in a first target region according to a first image of the first target region by using a first classifier, and classifying the first target objects in the first target region into a plurality of first categories;

identifying second target objects in a second target region according to a second image of the second target region by using a second classifier, and classifying the second target objects in the second target region into a plurality of second categories, wherein the plurality of first categories is different than the plurality of second categories, and the second image of the second target region is acquired synchronously with the first image of the first target region; and determining association relationships between the first target objects of the plurality of first categories in the first image of the first target region acquired by a first image acquisition apparatus and the second target objects of the plurality of second categories in the second image of the second target region synchronously acquired by a second image acquisition apparatus, wherein the second target region comprises all of the first target region, the first image is a view of key regions in the first target region comprising the first target objects, the second image is a view of a global scope for the second target region comprising the second target objects, and the first target objects are different from the second target objects; and a resolution of the first image acquisition apparatus is higher than a resolution of the second image acquisition apparatus, and a field of view of the second image acquisition apparatus is greater than a field of view of the first image acquisition apparatus.

* * * * *